July 14, 1942.  A. J. MATTER  2,289,850
WORK HOLDER FOR ARTICLE-THREADING MACHINES
Filed Sept. 14, 1940   2 Sheets-Sheet 1
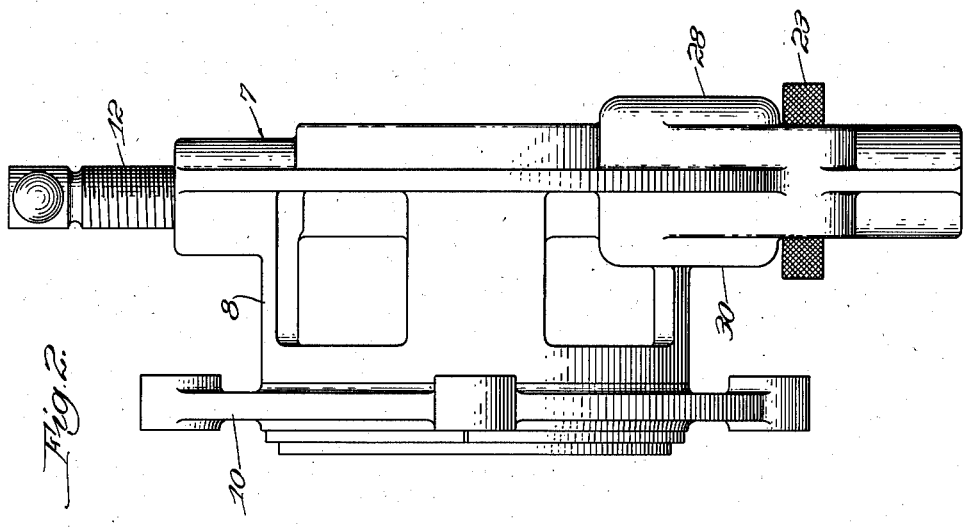
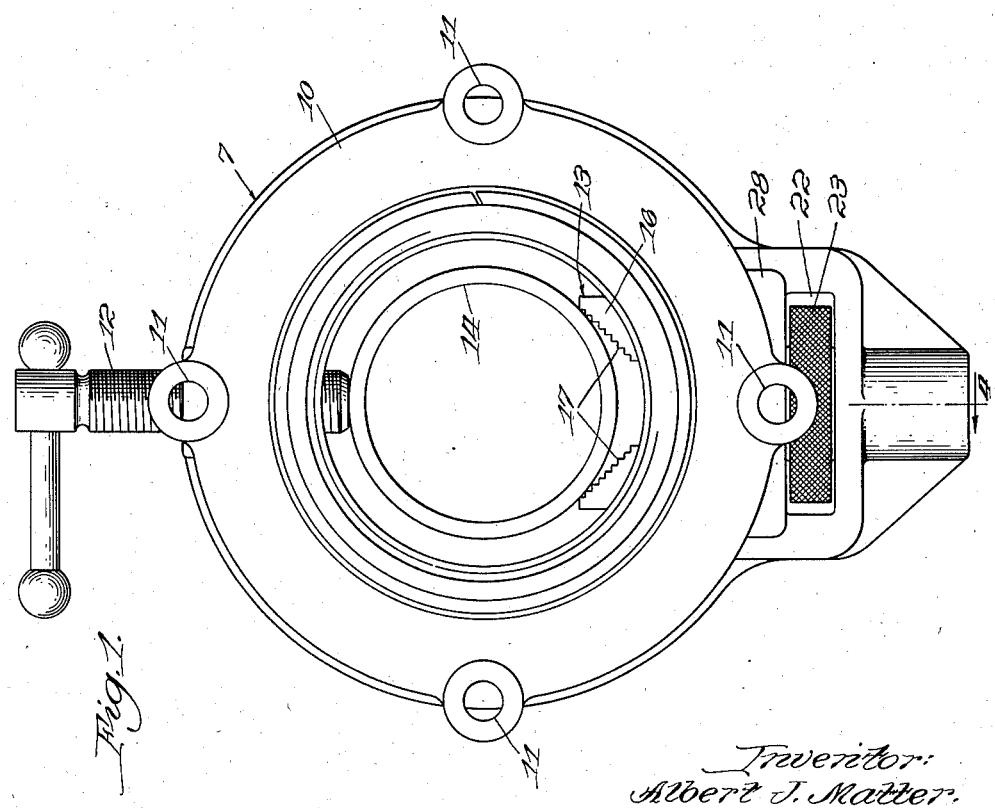
Inventor:
Albert J. Matter.
By Chritton, Wiles, Davies, Hirschl & Dawson.
Attys.

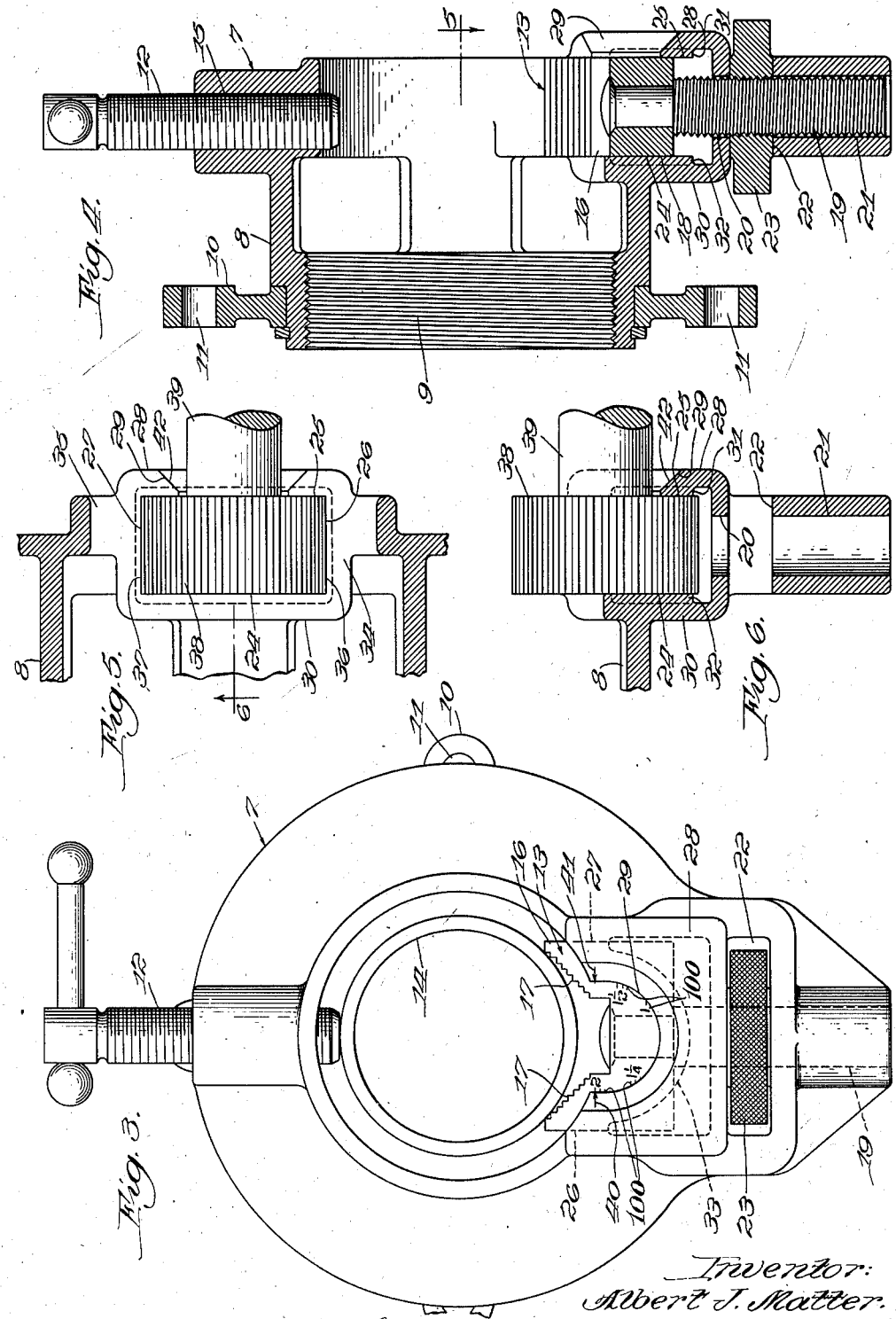

Patented July 14, 1942

2,289,850

UNITED STATES PATENT OFFICE 2,289,850

WORK HOLDER FOR ARTICLE-THREADING MACHINES

Albert J. Matter, Park Ridge, Ill., assignor to The Nye Tool & Machine Works, Chicago, Ill., a corporation of Illinois Application September 14, 1940, Serial No. 356,874

7 Claims. (Cl. 10—107)

My invention relates to improvements in that type of work holder which is provided to firmly hold an article, such as for example a pipe, to be threaded, during the operation of a pipe-threading stock operatively associated with the work holder, such stocks customarily having threaded connection with the work holder and comprising chasers mounted for radial movement relative to the article to be threaded and means which operate when the stock is rotated to cause the chasers to recede from the article.

One of my objects is to provide a simple and economical construction of work holder.

Another object is to provide for the holding of the articles in centered position relative to the die stock.

Another object is to provide a work holder which shall be adapted to be quickly and accurately adjusted to set position for holding articles of different diameters in the desired centered position.

Another object is to facilitate the forming of the guide ways for the radially movable jaws of work holders.

Another object is to provide for the quick setting of the work holder into position for cutting a crooked thread; and other objects as will be manifest from the following description.

Referring to the accompanying drawings:

Figure 1 is a front view of a work holder embodying my invention.

Figure 2 is a view in side elevation of the work holder.

Figure 3 is a view like Fig. 1 but viewing the structure in the opposite direction.

Figure 4 is a sectional view of the work holder, the section being taken at the line 4 on Fig. 1 and viewed in the direction of the arrow.

Figure 5 is a fragmentary plan sectional view of the holder showing it in the process of milling out the guide way for the radially movable jaw of the holder, the section being taken as indicated by the line 5 on Fig. 4 and viewed in the direction of the arrow; and Figure 6, a fragmentary view of the parts shown in Fig. 5, viewing them on a line corresponding with the section line 4 of Fig. 1.

The construction shown comprises a ring member 7 having a coaxial hub portion 8 internally threaded as represented at 9 for threaded connection with a die-stock (not shown) in accordance with common practice; the hub portion 8 carrying a ring 10 rotatable thereon and having openings 11 in which taper pins (not shown) for operating the chasers of the die-stock with which the holder is to be used, are secured in accordance with common practice.

The ring member 7 is provided with a pair of diametrically opposed radially movable jaws 12 and 13 for holding the article to be threaded, as for example a pipe as shown at 14.

The jaw 12 which is provided to clamp the article against the jaw 13 is in the form of a screw threaded in a threaded opening 15 in the ring member 7.

The jaw 13 is formed of a head 16 shaped to present inwardly divergent serrated jaw surfaces 17 symmetrically disposed relative to the longitudinal axis of the jaw 12 as shown. The head 16 is radially slidable in a guide way 18 formed in the ring member 7 and is rigidly attached to the inner end of a screw 19 slidable in unthreaded openings 20 and 21 in the ring member 7.

The ring member 7, between the ends of the screw 19, is slotted as represented at 22 to receive a nut 23 threaded on the screw 19. Thus by rotating the nut 23 the jaw 13 may be moved radially inwardly or outwardly depending on the direction in which the nut is rotated.

To facilitate the milling of the guide surfaces 24, 25, 26 and 27 of the guide way 18, the front wall 28 thereof is arcuately recessed as indicated at 29; the inner surfaces of the front wall 29 and the rear wall 30 of the guide way are formed with alined bosses 31 and 32, respectively, the lower edges of which are of curved form, and are concentric with the recess 29 as shown at 33 of the boss 31, the radius of the curved surfaces of the bosses 31 and 32 being less than that of the milling cutter to be used for machining the guide-way 18, and the upper portions of the side walls 34 and 35 of the guide way 18 are formed with bosses 36 and 37, respectively. It is thus possible to machine all four spaces 24—27 of the guide-way 18 by one operation of the milling cutter, such as for example that shown at 38 and mounted on an arbor 39, as no obstruction is presented to the crosswise movement of the arbor and the milling cutter entirely traverses the faces of the bosses 31, 32, 36 and 37 in the movement of the cutter to final cutting position as shown in Fig. 6.

The head 16 and the outer surface of the arcuate wall of the recess 29 are provided with means for indexing or gaging the adjustment of the jaw 13 into the desired set position for articles of different diameters to be clamped in the holder. In the construction shown these means comprise pointer lines 40 and 41 on the member 7 at opposite sides of the recess 29 and scales on the head 16 for cooperation with these pointer lines. The scales are shown as having graduations for 1, 1¼, 1½ and 2 inch diameter articles and in the set position of the jaw 13 as shown in Fig. 3 it is set for a 2" diameter article.

Relatively fine graduations disposed below the article-diameter markings referred to, and indicated at 100 are provided to set the jaw 13 more or less out of a position in which the article will be centered relative to the die-stock, in order that a crooked or offset thread of the desired magnitude may be cut if desired.

Preferably the outer surface of the wall bounding the recess 29 is beveled as indicated at 42, to facilitate the accurate adjustment of the jaw 13 into the desired set position.

In the use of the work holder the operator, assuming a normal straight thread is to be cut, adjusts the jaw 13, by the nut 23, into the desired set position for the particular diameter of article to be threaded, and determined by the scale means provided; and, with the article disposed between the jaw 13 and clamp screw 12, clamps the article firmly in the work holder by tightening the screw 12 against the article, thereby accurately centering the article in the holder.

When a crooked or offset thread is to be produced the jaw 13 is set, in accordance with the fine graduations referred to, into the desired off-center position for the particular diameter of article to be clamped in the holder and the screw 12 then tightened against the article.

While I have illustrated and described a particular embodiment of my invention I do not wish to be understood as intending to limit it thereto, as the construction shown may be variously modified and altered and the invention embodied in other forms of structure without departing from the spirit of the invention.

What I claim as new and desire to secure by Letters Patent, is:

1. A work holder comprising a body portion, a radially slidable jaw on said body portion, said body portion having a guide way for said jaw one of the walls of which is recessed to receive the arbor of a milling cutter in the machining of the guide surfaces of said guide way to the desired depth, whereby said guide surfaces may be machined in one operation by the milling cutter.

2. A work holder comprising a body portion, a radially slidable jaw on said body portion, said body portion having a guide way for said jaw having bosses on its opposed surfaces and a recess in one of said bosses, said bosses and said recess extending to such depths that a milling cutter with its arbor in registration with said recess may entirely traverse said bosses to form said guide way by one operation of the milling cutter.

3. A work-holder comprising a ring member having a noncircular guideway, a jaw member having a substantially V-shaped notch slidable in said guideway and restrained by said guideway against rotation in said guideway and provided with a threaded stud extending through an end of said guideway, a nut for adjusting said jaw member threaded on said stud and reacting against a surface of said ring member and indexing means for said jaw member comprising a scale on said jaw member and an indexing mark on said ring member.

4. A work-holder comprising a ring member having a noncircular guideway, a jaw member having a substantially V-shaped notch slidable in said guideway and restrained by said guideway against rotation in said guideway and provided with a threaded stud extending through an end of said guideway, said ring member having an opening at said stud and a nut in said opening threaded on said stud for adjusting said jaw.

5. A work-holder comprising a ring member, a substantially V-shaped jaw on said member, means for adjusting said jaw, indexing means for determining the setting of said jaw comprising a scale on said jaw and an indexing mark on said member, and means on said member for clamping the work against said jaw, said first-named and last-named means being separately adjustable.

6. A work holder comprising a ring member, a V-shaped jaw movable as an integer radially of said ring-member, guide surfaces for said movement surrounding said jaw and formed integral with said ring member, means for clamping work against said V-member in its adjusted position, and means for moving said V-member for its adjustment independent of said clamping means.

7. A work holder comprising a ring member having a work-receiving opening and formed integrally with a hollow boss the non-circular interior thereof open to said work-receiving opening, a jaw member formed with a V-shaped work-contacting surface and with a non-circular exterior surface fitting and slidable in said boss, and means to adjust said jaw radially of said work receiving opening.

ALBERT J. MATTER.